J. M. BIERER.
DOUGH DIVIDING MACHINE.
APPLICATION FILED JAN. 21, 1910.

1,098,552.

Patented June 2, 1914.
3 SHEETS—SHEET 1.

Witnesses:
Nathan C. Lombard
Lucy E. Orey

Inventor:
John M. Bierer,
by Walter E. Lombard,
Atty

J. M. BIERER.
DOUGH DIVIDING MACHINE.
APPLICATION FILED JAN. 21, 1910.
1,098,552.
Patented June 2, 1914.
3 SHEETS—SHEET 2.
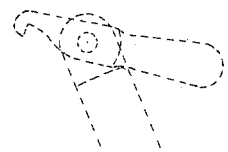
Fig. 2.
Fig. 6.
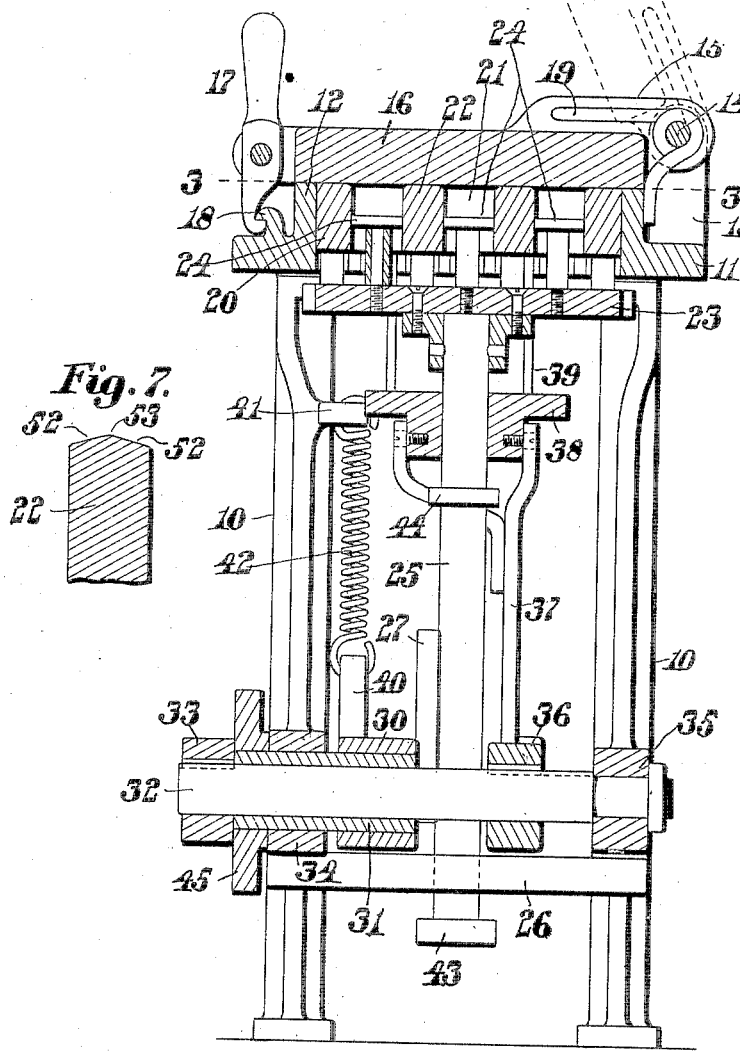
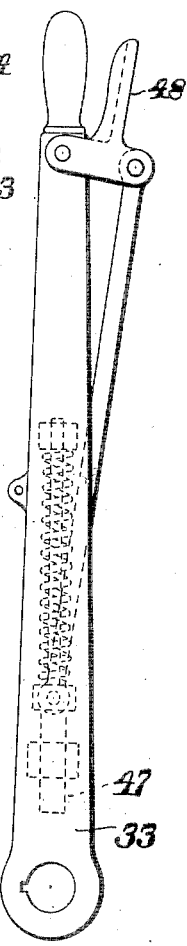
Fig. 7.
Witnesses:
Nathan C. Lombard
Lucy E. Arey
Inventor:
John M. Bierer,
by Walter E. Lombard,
Atty.

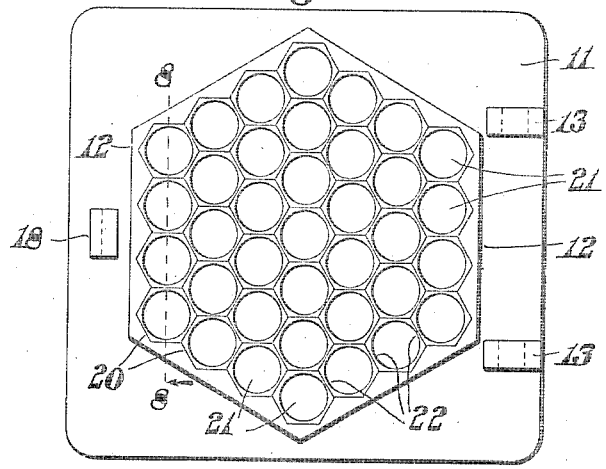
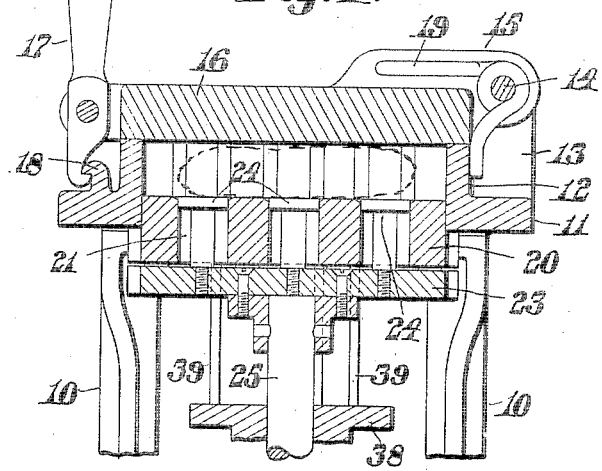
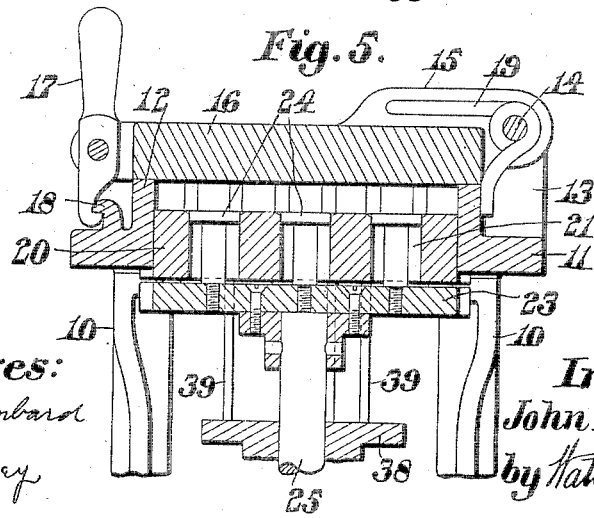

UNITED STATES PATENT OFFICE.

JOHN M. BIERER, OF FRONT ROYAL, VIRGINIA, ASSIGNOR, BY MESNE ASSIGNMENTS, TO THE A. F. WARD MACHINERY CO., A CORPORATION OF MASSACHUSETTS.

DOUGH-DIVIDING MACHINE.

1,098,552.  Specification of Letters Patent.  Patented June 2, 1914.

Application filed January 21, 1910. Serial No. 539,384.

*To all whom it may concern:*

Be it known that I, JOHN M. BIERER, a citizen of the United States of America, and a resident of Front Royal, in the county of Warren and State of Virginia, have invented certain new and useful Improvements in Dough-Dividing Machines, of which the following is a specification.

This invention relates to machines for subdividing a mass of dough or similar material into fractional parts.

The object of the invention is the production of a machine by which the mass of dough will not be cut through leaving exposed portions of raw dough, but will instead force the upper and lower skins of the dough together, and unite them so that each fractional part of said divided mass will be completely enveloped by a skin with no portion of the raw dough exposed,—this operation dispensing with any necessity of hand work on the fractional parts prior to baking as is now the general practice.

The invention further consists in certain novel features of construction and arrangement of parts which will be readily understood upon reference to the description of the drawings and to the claims hereinafter given.

Figure 1:
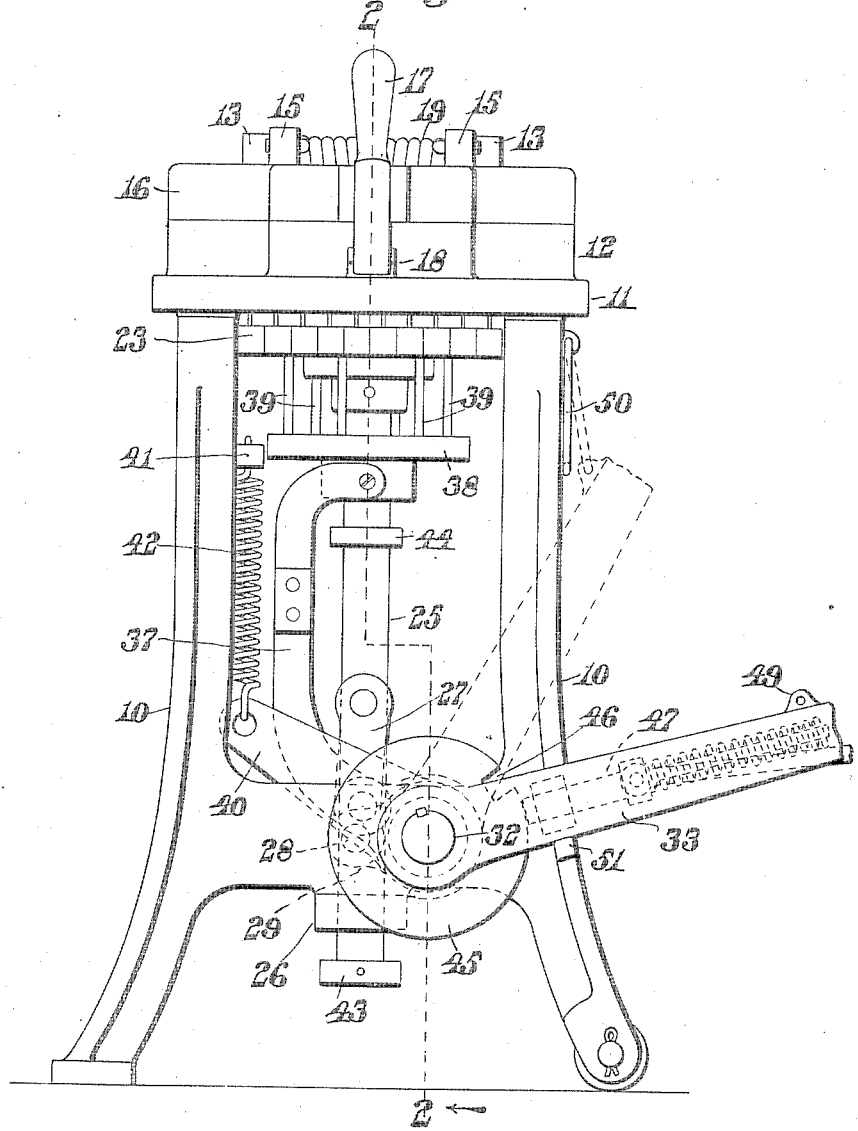
Figure 2:
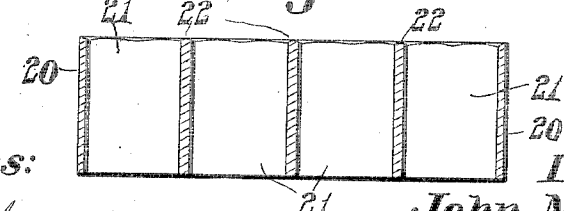

Of the drawings: Figure 1 represents an elevation of the machine embodying the present invention. Fig. 2 represents a vertical section of the same, the cutting plane being on line 2—2 on Fig. 1. Fig. 3 represents a plan of the pan portion of said machine with the cover removed therefrom. Fig. 4 represents a vertical section of the upper portion of said machine, the cutting plane being on line 2—2 on Fig. 1,—the movable perforated bottom of the pan and the plungers in the perforations thereof being shown in their normal positions after having received a mass of dough indicated in said figure by dotted lines. Fig. 5 represents a similar view showing the movable bottom and plungers therein moved into a position to compress the mass of dough against the cover of the receptacle. Fig. 6 represents an elevation of the operating arm. Fig. 7 represents a sectional view of the upper portion of one of the dividing members between two of the cylindrical openings in said movable perforated bottom; said figure being drawn to an enlarged scale, and Fig. 8 represents an enlarged section of the movable perforated bottom, the cutting plane being on line 8—8 on Fig. 3.

Similar characters designate like parts throughout the several figures of the drawings.

In the drawings, 10 represents a suitable framework to the upper end of which is secured a perforated plate 11 having formed integrally therewith an upwardly extending flange 12 surrounding said perforation, and forming a suitable pan or receptacle for the reception of the dough to be operated upon. The perforated plate 11 is also provided with ears 13 in which is mounted a pivot pin 14 passing through ears 15 formed upon a cover 16 which is provided with a pivoted locking member 17 adapted to engage a hooked lug on the upper face of the plate 11, said locking member being preferably opposite to the pivot pin 14. When the locking member 17 is in engagement with the hooked lug 18 as indicated in Figs. 2, 4 and 5, the upper end of the perforation or opening through the plate 11 is effectually closed and capable of sustaining considerable pressure. When the locking member 17 is disengaged from the hooked lug 18, the cover 16 will be thrown upwardly automatically into the position shown in dotted lines in Fig. 2, by means of the spring member 19 surrounding the pivot pin 14 having ends engaging the ears 15 on said cover 16, the other end engaging the flange 12. When it is desired to close the opening in the plate 11, the operator takes hold of the handle 17 and moves the cover downwardly against the tension of the spring 19 and locks the cover in the position shown in full lines in Figs. 2, 4 and 5.

Mounted in the opening of the plate 11 and accurately fitting the walls thereof is a movable perforated bottom 20, in which the perforations 21 are cylindrical as indicated in Fig. 3 of the drawings. The upper surface of the divisional walls 22 between the various perforations 21 are inclined downwardly toward said perforations and the apex of said inclined surfaces is slightly rounded over as is also true of the corners at the intersections of the inclined surfaces and the vertical walls of said perforations as is clearly indicated in Fig. 7 of the drawings. Beneath said perforated bottom 20 is a plate 23 to which is secured a plurality of plungers 24, one for each of the perforations 21. This plate 23 is secured to a vertical support 25 having a bearing at its lower end in the cross member 26 forming a part of the frame 10. Intermediate the plate 23 and the cross member 26 the support 25 has pivoted thereto a link 27, the opposite end of which is pivoted at 28 to an arm 29 formed upon a hub 30 mounted upon and keyed to a sleeve 31 surrounding an oscillating shaft 32, this oscillating shaft having keyed thereto an operating arm 33.

The sleeve 31 is revolubly mounted in a bearing 34 in one side of the frame 10 and forms a bearing for one end of the shaft 32,—while the opposite end of said shaft 32 is mounted in a bearing 35 in the opposite side of said frame 10. Intermediate the bearing 35 and the sleeve 31, the shaft 32 has keyed thereto a lever 36 the outer end of which is connected by means of a bifurcated link 37 with an annular member 38 surrounding the support 25. This annular member 38 has secured thereto a plurality of rods 39 extending upwardly through the plate 23 with their opposite ends permanently secured to the movable bottom 20. It is obvious therefore, that any reciprocating movement of the annular member 38 will be transmitted through the rods 39 to the movable bottom 20; and it is also obvious that any reciprocating movement imparted to the support 25 will be transmitted through the plate 23 to the plungers 24 within the perforations 21 of said movable bottom 20.

The hub 30 is provided with a second arm 40 between the outer end of which and the lug 41 formed upon the frame 10 is interposed a spring 42 the tension of which is adapted to move the support 25 and the plungers 24 upwardly against the dough within the pan, pressing the mass of dough against the under face of the cover 16. When the cover 16 is in the position shown in dotted lines in Fig. 2, there will be nothing to resist the further upward movement of the plungers 24, and the spring 42 will act upon said plungers through the medium of the lever 29, the link 27, supports 25, and plate 23 until the upper face of the collar 43 contacts with the under face of the cross bar 26, when the further upward movement of the plungers will be prevented.

When the upper face of the collar 43 contacts with the cross bar 26, the upper faces of the plungers 24 will be in the same plane as the upper face of the flange 12. The support 25 is provided with a flange 44 which prevents the member 38 from being moved downwardly on said support 25 sufficiently to permit the upper face of the movable bottom 20 to pass below the upper faces of the plungers 24. On the outside of the frame 10 between the operating arm 33 and the bearing 34, the sleeve 31 has keyed thereto a notched disk 45 with the notch 46 of which, a spring-pressed bolt 47, carried by the operating arm 33, is adapted to engage to give to said sleeve a predetermined movement about the axis of the oscillating shaft 32. This bolt 47 is controlled by means of a pivoted handle 48 mounted upon the outer end of the operating arm 33 in the usual manner. The arm 33 is provided with a perforated lug 49 with which the hook 50 secured to the frame 10 is adapted to engage to retain the operating arm in elevated position as indicated in dotted lines in Fig. 1 when the machine is not in operation. This position of the operating arm 33 is its normal position, and when thus located the perforated bottom 20 and the plungers 24 are in their lowest position as indicated in Fig. 4 of the drawings.

When the bottom 20 and plungers 24 are in their lowest position the cover 16 is raised and a mass of dough placed upon said perforated bottom and plungers and the cover is then shut down and locked as indicated in said figure. The operator then disengages the hook 50 from the perforated lug 49 and with the bolt 47 in engagement with the notch 46 of the disk 45, he applies manual power to said operating arm and moves the bottom 20 and the plungers 24 in unison until sufficient pressure has been applied to the mass of dough contained within the pan or receptacle to compress it between the cover 16 and the said bottom and plungers.

When the limit of compression has been reached, the operator manipulates the pivoted handle 48 and disengages the bolt 47 from the notch 46, the spring 42 retaining the plungers in position against the under face of the dough. Prior to the placing of the dough in the pan or receptacle it is manipulated by hand until its outer surface has formed thereon a tough skin enveloping the whole mass of raw dough, and the pressure applied thereto when the plungers and bottom are moved from the position shown in Fig. 4 to the position shown in Fig. 5 of the drawings, acts thereon without effecting any break in said skin.

The operator having disengaged the bolt 47 from the notch 46 moves the operating arm 33 into the position indicated in full lines in Fig. 1, against the stop 51 formed upon the frame 10,—this stop 51 limiting the upward movement of the perforated bottom so that its upper face never moves above the upper face of the flange 12,—or in other words, when the cover 16 is closed as indicated in full lines in the drawings, the upper face of the perforated movable bottom 20 comes into close contact with the under face of said cover 16 and can have no further movement, thus preventing any injury to the divisional walls thereof between the perforations 21. Owing to the nature of the upper faces of these divisional walls between the perforations 21, the dough is not cut and separated as the perforated bottom passes through the mass of dough,—but in lieu of this cutting, the under skin of the mass of dough is pressed upwardly into contact with the upper skin of the dough and adheres thereto, thus enveloping each fractional part of said dough with a skin, thereby leaving no portion of the raw dough exposed. Owing to the inclines 52 on the upper face of the divisional walls 22, the upper and lower skins are gradually crowded together and forced into the cylindrical perforations 21 and no separation between the fractional parts of the dough occurs until the apex 53 of said divisional walls 33 comes into close contact with the under face of the cover 16. When this has been accomplished, each perforation 21 contains a fractional part of said dough completely enveloped in a skin preventing any of the raw dough from being exposed,—said fractional parts being all of equal size and weight and of the same shape.

No machine as far as is known, is capable of subdividing a mass of dough into a number of fractional parts each one of which is enveloped in a skin, preventing any portion of the raw dough from being exposed, thus obviating any hand work after the fractional parts have been delivered from the machine. The present machine is capable of securing this desirable result, as after the pressure has been applied to the dough and the bottom has been moved up through the same, substantially welding the under and upper skins together so that each fractional part is surrounded by a skin, each part is in condition to be slid into a baking pan and put into the oven without any further labor. The machine furthermore provides a means for sliding the fractional parts thus made from the machine directly into the pan without any unnecessary handling,—for as soon as the perforated bottom has been pressed against the cover 16 and the mass of dough has been divided into fractional parts, the operator then has only to disengage the locking member 17 thus permitting the spring 19 to act upon the cover 16 to throw it into its elevated position as shown in dotted lines in Fig. 2, when the spring 42 will act upon the plungers 24 to raise them to a position with their upper faces in the same plane with the upper face of the perforated bottom 20 and the flange 12.

The machine is particularly adapted for use in making rolls or bread from a dough which has a tough outer surface which is adapted to adhere to the walls of the perforated bottom and be carried upwardly thereby until it is united with the top skin.

It is believed that the operation and many advantages of this invention will be clearly understood from the foregoing explanation.

Having thus described my invention, I claim:

1. A dough-dividing machine having, in combination, a dough receptacle for receiving a mass of raw dough enveloped by a tough skin, said receptacle having a flat wall, and means for sub-dividing the mass of dough into fractional parts each enveloped by a skin, including a relatively movable dough-dividing blade operating against said flat wall and having a comparatively broad operating face comprising two slightly inclined surfaces forming a very blunt apex or angle at their intersection, said slightly inclined surfaces acting to carry the skin in an unbroken condition from one side of the mass through the mass and into contact with the skin on the opposite side with which it is welded by the pressure of the blunt apex against the opposing flat wall before the mass of dough is separated into its fractional parts.

2. A dough-dividing machine having, in combination, a dough receptacle for receiving a mass of raw dough enveloped by a tough skin, said receptacle having a flat wall, and means for subdividing the mass of dough into fractional parts each enveloped by a skin, including a relatively movable dough dividing blade operating against said flat wall and having a comparatively broad operating face comprising two slightly inclined surfaces forming an apex or angle of about 150° at their intersection, said slightly inclined surfaces acting to carry the skin in an unbroken condition from one side of the mass through the mass and into contact with the skin in the opposite side with which it is welded by the pressure of the blunt apex against the opposing flat wall before the mass of dough is separated into its fractional parts.

3. A dough-dividing machine having, in combination, a dough receptacle for receiving the mass of raw dough enveloped by a tough skin, and means for subdividing the mass of dough into fractional parts each enveloped by a skin, including a relatively movable dough dividing blade operating against the opposite wall of the receptacle and having a comparatively broad operating face comprising two slightly inclined surfaces forming a very blunt apex or angle at their intersection, said slightly inclined surfaces acting to carry the skin in an unbroken condition from one side of the mass through the mass and into contact with the skin on the opposite side with which it is welded by the pressure of the blunt apex against the opposite wall before the mass of dough is separated into its fractional parts.

Signed by me at #4 Post Office Square, Boston, Mass., this 20th day of January, 1910.

JOHN M. BIERER.

Witnesses:
 WALTER E. LOMBARD.
 LUCY E. AREY.